United States Patent

[11] 3,556,473

| [72] | Inventor | Domer Scaramucci |
| | | 3245 Hattie, Oklahoma City, Okla. 73129 |
| [21] | Appl. No. | 797,069 |
| [22] | Filed | Feb. 6, 1969 |
| [45] | Patented | Jan. 19, 1971 |
| | | Continuation-in-part of application Ser. No. 763,644, Sept. 30, 1968, now Patent No. 3,531,081. |

[54] VALVE ASSEMBLY WITH REPLACEMENT VALVE UNIT
9 Claims, 1 Drawing Fig.

[52] U.S. Cl. ................................................... 251/151, 251/315
[51] Int. Cl. .................................................... F16k 5/06
[50] Field of Search ........................................ 251/148, 151, 315, 292; 137/375

[56] References Cited
UNITED STATES PATENTS

| 2,819,868 | 1/1958 | Cauffman | 251/315 |
| 3,306,316 | 2/1967 | Stillwagon | 137/613X |
| 3,401,913 | 9/1968 | Scaramucci | 251/151 |
| 3,405,908 | 10/1968 | Scaramucci | 251/148 |
| 3,463,451 | 8/1969 | Treadwell | 251/315 |

FOREIGN PATENTS

| 1,154,319 | 9/1963 | Germany | 251/315 |

Primary Examiner—M. Cary Nelson
Assistant Examiner—Michael O. Sturm
Attorney—Dunlap, Laney, Hessin and Dougherty ABSTRACT: A valve assembly, particularly useful between flanges, which utilizes a housing unit and a separate valve unit. The housing unit provides a supporting housing adapted to be supported between the flanges and includes a valve operator and valve stem. The valve unit is sized to be inserted in the housing unit and includes a valve member and seats. The valve stem is carried by the housing unit and is insertable lengthwise into connection with the valve member. In an assembled position, the valve unit is sealed against the flanges and prevents the housing unit from being contacted by fluid controlled by the valve.

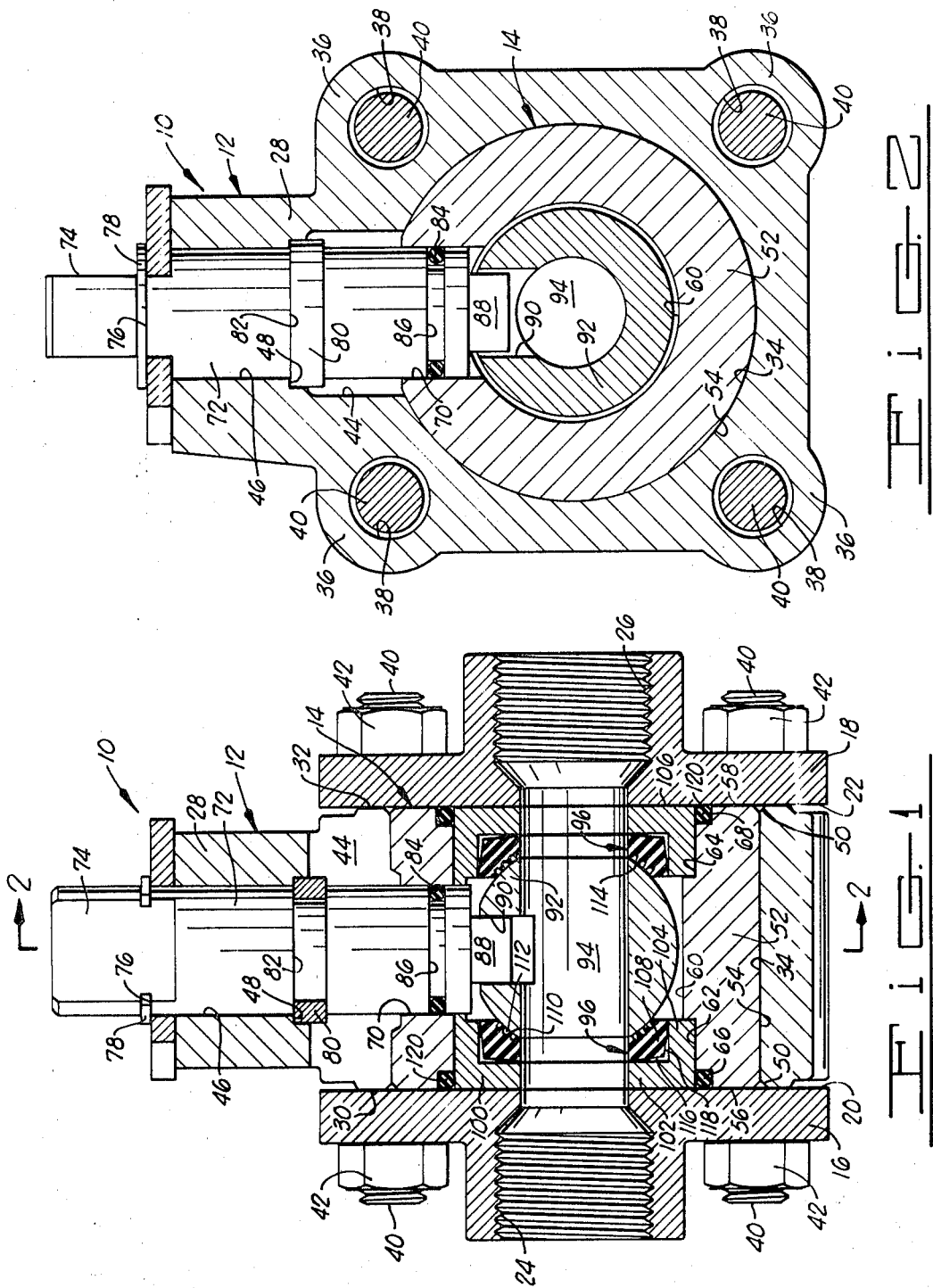
INVENTOR.
DOMER SCARAMUCCI
BY
Dunlap, Laney, Hessin & Dougherty
ATTORNEYS 3,556,473

VALVE ASSEMBLY WITH REPLACEMENT VALVE UNIT

CROSS-REFERENCE TO RELATED APPLICATIONS

This application is a continuation-in-part of applicant's copending application entitled "Valve Assembly With Insertable Valve Unit," Ser. No. 763,644, filed Sept. 30, 1968 now U.S. Pat. No. 3,531,081. Related subject matter is disclosed and claimed in applicant's copending application entitled "Valve Assembly with Drop-Type Stem," Ser. No. 781,310, filed Dec. 5, 1968.

BACKGROUND OF THE INVENTION

1. Field of the Invention

This invention relates generally to an improved valve assembly utilizing a housing unit and a separate valve unit, and more particularly, but not by way of limitation, to an improved valve assembly utilizing a housing unit and a separate valve unit wherein the valve stem is carried by the housing unit and is inserted lengthwise for interconnection with the valve member.

2. Description of the Prior Art

In prior valve assemblies, the valve body provides the necessary structural strength for the valve assembly, and yet is normally exposed to the fluid being controlled by the valve assembly. Therefore, in those situations where the valve assembly is used to control highly corrosive fluids, requiring what may be considered exotic materials of construction for those parts in contact with the fluid, the resulting valve assembly is unduly expensive.

SUMMARY OF THE INVENTION

Applicant's copending application, "Valve Assembly With Insertable Valve Unit," Ser. No. 763,644, filed Sept. 30, 1968, disclosed a valve assembly having a separate housing unit and a separate valve unit. In this disclosure two valve stems were employed. One valve stem was disposed in, and supported by, the housing unit, and the second valve stem was disposed in, and supported by, the valve unit.

There are instances where, for the convenience of manufacture, interchangeability and economy it is desirable to have a valve assembly having all of the advantages of the insertable, replaceable valve unit, and yet having a single valve stem, insertable lengthwise from the top portion of the housing unit for interconnection with the valve member, and the present invention contemplates such a structure.

An object of the invention is to facilitate the repair of valve assemblies in the field.

Another object of this invention is to provide a valve assembly wherein the cost of the parts of the valve assembly exposed to the fluid being controlled by the assembly is reduced to a minimum.

A further object of the invention is to provide a valve assembly, having a housing unit and a separate insertable valve unit, wherein a single valve stem is used to interconnect the valve member, which is disposed in the valve unit, to the valve handle or other operator.

A further object of the invention is to provide a valve assembly which may be economically manufactured, which may be repaired in the field in a minimum of time, and which will have a long service life.

Other objects and advantages of the invention will be evident from the following detailed description when read in conjunction with the accompanying drawings which illustrate a preferred embodiment of the invention.

BRIEF DESCRIPTION OF THE DRAWINGS

FIG. 1 is a sectional view of a valve assembly, assembled between two flanges.

FIG. 2 is a sectional view of the valve assembly of FIG. 1, taken substantially along the lines 2-2 of FIG. 1.

DESCRIPTION OF THE PREFERRED EMBODIMENT

Referring to the drawings in detail, and to FIGS. 1 and 2 in particular, shown therein and designated by the general reference character 10, is a valve assembly constructed in accordance with the invention. The valve assembly basically comprises a housing unit 12 and a valve unit 14.

The valve assembly 10, as shown more clearly in FIG. 1, is disposed generally between flanges 16 and 18. Each of the flanges 16 and 18 includes an end face 20 and 22, and a threaded opening 24 and 26, respectively. The threaded openings 24 and 26 are axially aligned and sized to receive the threaded ends of adjacent sections of a conduit (not shown).

The housing unit 12 includes a tubular housing 28 having opposite end faces 30 and 32, and a bore 34 extending therethrough. A flange portion 36 is formed on the outer periphery of housing 28 and, as shown more clearly in FIG. 2, four holes are provided therethrough. The housing unit 12, the valve unit 14 and the flanges 16 and 18 are held in assembled relationship by a plurality of threaded bolts 40 that extend through the flanges 16 and 18 and through the holes 38 of the housing 28. Each of the bolts 40 is provided with a pair of threaded nuts 42 that engage the flanges 16 and 18.

A slot 44 is formed in the housing 28 along the top of the bore 34, for purposes which will become more apparent hereinafter. An aperture 46 extends transversely through the housing 28 intersecting the slot 44. The aperture 46 is provided with a counterbore adjacent its intersection with the slot 44, thereby providing a planar surface 48 in the housing 28.

The inner periphery of the end faces 30 and 32 of housing 28 are provided with champhers 50 to more easily accommodate the installation of the valve unit 14.

The valve unit 14 includes a valve body 52 having an outer periphery 54 sized to slidingly fit into the bore 34 of the housing 28, and having opposite end faces 56 and 58. A bore 60 extends through the valve body 52 intersecting the end faces 56 and 58 to form the valve chamber of the valve. Counterbores 62 and 64 are formed in the valve body 52 of valve unit 14 adjacent the end faces 56 and 58, respectively. Additional counterbores 66 and 68 are formed in a portion of the counterbores 62 and 64, respectively, and are also located adjacent the end faces 56 and 58.

An aperture 70 extends transversely through the valve body 52 intersecting the bore 60. The aperture 70 is located between the end faces 56 and 58 of the valve body 52, such that when the valve unit 14 is in an assembled position, as shown in FIGS. 1 and 2, the aperture 70 is aligned with the aperture 46 of the housing 28.

A valve stem 72 is journaled in the housing 28 and the valve body 52, and extends through the transversely extending apertures 46 and 70 of the housing 28 and the valve body 52, respectively. The upper portion 74 of the valve stem 72 is adapted to receive and cooperate with a valve handle or other suitable operator (not shown) for turning the valve stem 72 and thereby rotating a valve member from a fully open to a fully closed position, as will be described more fully hereinafter. As well known in the art, various forms of valve handles and connections may be used. In one form, for example, the handle is connected to the upper portion 74 of the valve stem 72 by a pin, and includes a lug portion that is engageable with a pair of abutments on the housing 28 to limit the rotational movement of the handle and the interconnected valve member to approximately 90°.

A groove 76 is formed in the upper portion 74 of the valve stem 72 and a retaining ring 78 is disposed in the groove 76 to limit the downward movement of the valve stem 72.

A split bushing 80 is disposed in a groove 82, which is formed in the outer periphery of the valve stem 72. The split bushing 80 is positioned such that, in an assembled position as shown in FIGS. 1 and 2, the split bushing 80 will abut the planar surface 48 in the housing 28, and thereby prevent upward movement of the valve stem 72.

An O-ring seal 84 is disposed in an annular groove 86 formed in the valve stem 72. The O-ring seal 84 and the annular groove 86 are positioned on the valve stem 72 such that the O-ring seal 84 sealingly engages the wall formed by the aperture 70 of the valve body 52, and thereby provides a fluidtight seal between the valve body 52 and the valve stem 72.

A rectangularly shaped end 88 is formed on the lower most end portion of the valve stem 72. The rectangular end 88 is shaped to fit in a rectangular recess 90, which is formed in the exterior surface of a valve member or valve ball 92. The rectangular recess 90 of the valve ball 92 is longer than the rectangular end 88 of the valve stem 72 to permit movement of the valve ball 92 in a direction parallel to the bore 60 of the valve body 52 when the valve ball is turned to a closed position, for reasons which will become more apparent hereinafter.

The valve ball 92 is movably disposed in the bore 60 of the valve body 52. The valve ball 92 has a port 94 extending therethrough. When the valve ball 92 is in the open position, as shown in FIGS. 1 and 2, the port 94 is axially aligned with the threaded openings 24 and 26 of the flanges 16 and 18, respectively.

The bore 60 and the counterbores 62 and 64 of valve body 52 are provided to receive and cooperate with the upstream and downstream seat assemblies 96. In a preferred form, and as shown more clearly in FIG. 1, the upstream and downstream seat assemblies 96 are of identical construction and include a relatively rigid seat ring 100, having an L-shaped cross section with leg portions 102 and 104. The outer periphery of the seat ring 100 is sized to fit in the respective counterbore 62 or 64 of the valve body 52. The nonvalve member end 106 of the seat ring 100 is shaped normal to the axis of the valve unit 14 to abut the end face 20 or 22 of the flange 16 or 18, respectively.

An annular seal member 108 is disposed between the leg portions 102 and 104 of each seat ring 100. Each seal member 108 has a valve member end surface 110 thereon configured to sealingly engage the exterior surface of the valve ball 92. The surface 110 of each seal member 108 is formed on a radius that is slightly less than the radius of the valve ball 92. The surface 110 of each seal member 108 if is further provided with a plurality of annular grooves 112 therein forming a plurality of lands 114 thereon. The annular grooves 112 are widest adjacent the valve ball 92 whereby the lands 114 have a trapezoidal cross-sectional configuration with the smaller ends of the lands 114 engaging the valve ball 92.

The sides 116 and 118 of the seal member 108 are tapered and, as shown in FIG. 1, generally meet at an angle substantially greater than 90° to form a gap or chamber between the sides 116 and 118 of the seal member 108, and the adjacent leg portions 102 and 104 of the seat ring 100, for reasons which will become more apparent hereinafter.

An O-ring seal 120 is disposed in each counterbore 66 and 68 to sealingly engage the end faces 20 and 22 of the flanges 16 and 18, respectively, and to sealingly engage the seat ring 100 of each respective seat assembly 96.

Operation of FIGS. 1 and 2

As previously mentioned, the valve assembly 10 basically comprises two units; the housing unit 12, and the valve unit 14. The valve unit 14 will slide lengthwise into the bore 34 of the housing unit 12, the outer periphery 54 of the valve unit 14 being sized to slidingly fit into the bore 34 of the housing unit 12.

The valve unit 14 is slid into the housing unit 12 to a position wherein the aperture 70 of the valve body 52 is aligned with the aperture 46 of the housing 28. In this position, the end faces 30 and 32 of the housing 28 will be generally in alignment with the end faces 56 and 58 of the valve body 52.

The valve stem 72 is inserted downwardly through the aperture 46 in the housing 28, and further through the aperture 70 of the valve body 52. The valve stem 72 is positioned such that the rectangular end 88 thereof is disposed in the rectangular recess 90 of the valve ball 92.

The valve stem 72 is lowered in the apertures 46 and 70 to a position wherein the groove 82 of the valve stem 72 is fully exposed in the slot 44 of the housing 28. In this position of the valve stem 72, the split bushing 80 is disposed in the groove 82. The valve stem is then raised in the apertures 46 and 70 to a position wherein the split bushing 80 abuts the planar surface 48 in the housing 28, to limit the upward movement of the valve stem 72. The retaining ring 78 is then inserted in the groove 76 of the valve stem 72 to limit the downward movement of the valve stem 72.

The flanges 16 and 18 are disposed on opposite ends of the valve unit 14 and the housing unit 12, and the assembly is held in assembled relationship by the bolts 40, which extend through the flanges 16 and 18 and through the holes 38 of the housing 28. The valve assembly 10 is then secured into position by the nuts 42, which are disposed on the opposite ends of the bolts 40.

When the valve handle (not shown) is turned, the turning movement is transmitted to the valve ball 92 through the interconnection between the valve stem 72 and the valve ball 92. The valve ball 92 may, thus, be turned or rotated from the open position, shown in FIGS. 1 and 2, to the closed position; that is, the position wherein the port 94 of the valve ball 92 is at a right angle to the threaded openings 24 and 26 on the flanges 16 and 18. In this position, fluid will not flow through the valve.

In all operating positions of the valve assembly the fluid is isolated from the housing unit 12 by the O-rings 84 and 120. The O-ring 84 of the valve stem 72 sealingly engages the valve stem 72 and the wall formed by the aperture 70 of the valve body 52 and prevents the leakage of fluid therebetween. The O-rings 120 of the valve body 52 sealingly engages the valve body 52, the end faces 20 and 22 of the flanges 16 and 18, respectively, and each seat ring 100 of the seat assemblies 96 respectively, and thus prevent any leakage of fluid therebetween.

Since the components of the housing unit 12 will not be in contact with the fluid flowing through the valve, the housing unit assembly 12 may be constructed of any material such as cast iron or cast steel, the main considerations being strength and the economical construction of the housing unit 12.

The various components of the valve unit 14 may be constructed of any material compatible with the fluid flowing through the valve. In many applications, those components in contact with the fluid are specified to be constructed of a variety of exotic or expensive materials such as stainless steel or ceramics. Since the housing unit 12 provides the operational and structural strength requirements for the valve assembly 10, it follows that use of such materials in the valve unit 14 may be kept at a minimum in the present invention.

As previously mentioned, the rectangular end 88 of valve stem 72 is slightly smaller than the slot 90 in the surface of valve ball 92. Therefore, when the valve ball 92 is turned to the closed position, the valve ball 92 will be free to move upstream and downstream. It is apparent that the valve ball 92 is of the type known in the art as a "floating" valve member of ball. Assuming that a pressure exists in the inlet of the valve, a pressure differential will be applied across the valve ball 92 and the valve ball 92 will be moved downstream to engage the downstream seat assembly 96. When the valve ball 92 seats against the downstream seat assembly 96, the annular seal member 108 of the respective seat assembly 96 will sealingly engage the exterior surface of the valve ball 92. More particularly, the lands 114 of the respective annular seal member 108 will sealingly contact the valve ball 92.

A certain amount of fluid pressure will be trapped in the annular grooves 112 of the downstream annular seal member 108. This condition will result in a series of staged differential pressure seals being established across the surface of the respective annular seal member 108 with each seal member or ring cooperating with the next one to create a fluid tight seal.

In valve seats with relatively smooth sealing surfaces, particles tend to become trapped between the surface of the valve member and the seal member, and as the valve member is turned an abrasive-type wearing occurs at the surface of the seal member. The result of this occurence is a premature wearing of the seat assembly. In the seat assembly as shown more clearly in FIG. 1, any particles which become wedged between the surface of the valve ball 92 and the sealing surface of annular seal member 108 will fall into the annular grooves 112 and will then be washed away during the next opening of the valve ball 92, thereby eliminating the problem of premature wearing described above.

In FIG. 1, it may be observed that sides 116 and 118 of each annular seal member 108 are tapered. The tapered sides 116 and 118 permit the respective annular seal member 108 to self adjust to compensate for a varying valve load and seal engagement demand. The tapering of the sides 116 and 118 also permits the annular seal members 108 to self compensate for any swelling which may occur in the annular seal members 108 and likewise any wearing which will occur to the annular seal members 108.

Should the components of the valve unit 14, such as the valve ball 92, wear to the extent that replacement or repair is necessary, the entire valve unit 14 is replaced. The valve stem 72 is removed and the valve unit 14 is then free to be slipped out of the housing unit 12, by generally following the reverse of the procedure previously described for the insertion of the valve unit 14, and a new valve unit is installed. It is apparent that the above repair procedure results in a more efficient field repair of the valve, with less downtime.

In the form of the invention hereinbefore described, the housing unit 12 is designed to provide the operational and structural strength requirements for the valve assembly 10, and the housing unit 12 is isolated from the fluid flowing through the valve as previously described. Thus, in those situations where the components of a valve in contact with the fluid must be constructed of expensive materials, such as stainless steel or ceramics, the use of such material and, therefore, the cost of the valve is kept at a minimum.

If it becomes necessary to change the service of the particular valve, wherein different materials of construction are to be used for the components in contact with the fluid flowing therethrough, a new valve unit 14 is merely inserted in the housing unit 12, thus eliminating the additional cost of a new housing unit.

The particular construction of the valve stem 72 permits the valve stem 72 to be removed without the necessity of removing the valve unit 14. The advantage is particularly important when an automatic valve operator is used to turn the valve stem 72, because the valve operator and the valve stem 72 can be removed and replaced, or repaired without incurring the additional time and expense of having to remove the valve unit 14.

Changes may be made in the construction and arrangement of parts or elements of the various embodiments as disclosed herein without departing from the spirit and scope of the invention.

I claim:

1. A valve assembly for controlling the flow of fluid through adjacent pipe sections, comprising:
    a valve unit including:
        a valve body having an aperture in one side thereof and a bore extending lengthwise therethrough forming a valve chamber;
        a valve member supported in the valve chamber for opening and closing the valve assembly;
        seat means providing a seal between the valve member and the valve body when the valve member is moved to the closed position;
        means sealing the opposite ends of the valve body to the pipe sections to direct the flow of fluid from the pipe sections through the valve chamber in the valve body; and
    a housing unit including:
        a housing having a bore surrounding said valve unit and sized to slidingly receive and support the valve unit;
        means supporting the housing between the adjacent ends of the pipe sections; and
        a valve stem extending through the housing and adapted to be inserted lengthwise through the valve body aperture into connection with the valve member when the valve unit is inserted in the housing for transmitting movement of the valve stem to the valve member.

2. The valve assembly of claim 1 wherein the valve stem extends at right angles to the centerline of the bore in the valve body.

3. The valve assembly of claim 2 wherein the valve stem extends at right angles to the centerline of the bore in the housing.

4. The valve assembly of claim 1 wherein the valve stem includes a groove in the outer periphery thereof and a retaining ring disposed in the groove engaging the housing to limit the movement of the valve stem in one direction.

5. The valve assembly of claim 1 wherein the valve stem includes a groove encircling the outer periphery thereof, and an O-ring in said groove disposed to sealingly engage the valve body to form a fluidtight seal therebetween.

6. The valve assembly of claim 1 wherein the valve member is a ball.

7. The valve assembly of claim 1 wherein the housing is sized to encompass the valve body when the valve body is inserted into the housing and provides radial support for the valve body.

8. The valve assembly of claim 1 wherein the housing includes a slot formed along the inner periphery thereof and the valve stem includes a bushing disposed around a portion of the outer periphery thereof, said bushing engaging the housing to limit the movement of the valve stem in one direction, the bushing being sized to be inserted via the slot.

9. The valve assembly of claim 6 wherein the seat means includes:
    the seat ring disposed in each end of the valve chamber, having an L-shaped cross section forming two legs thereof; and
    a seal member supported between the two legs of each seal ring, each seal member having a valve member end and a nonvalve member end, the nonvalve member end of each seal member includes two sides which are tapered and generally meet at an angle substantially greater than 90° to form a chamber between the seal member and the adjacent leg portions of the respective L-shaped seat ring, the valve member end of each seal member being shaped to sealingly mate with the exterior surface of the ball valve member and has a plurality of annular grooves therein forming a plurality of lands thereon.